S009717187B2

United States Patent
Armstrong et al.

(10) Patent No.: US 9,717,187 B2
(45) Date of Patent: Aug. 1, 2017

(54) SECTIONAL PLANTER WITH TONGUE AND GROOVE INTERLOCKING DEVICE

(71) Applicants: Claudia Armstrong, Clarkston, MI (US); James Armstrong, Clarkston, MI (US)

(72) Inventors: Claudia Armstrong, Clarkston, MI (US); James Armstrong, Clarkston, MI (US)

(*) Notice: Subject to any disclaimer, the term of this patent is extended or adjusted under 35 U.S.C. 154(b) by 110 days.

(21) Appl. No.: 14/808,132

(22) Filed: Jul. 24, 2015

(65) Prior Publication Data
US 2016/0021831 A1    Jan. 28, 2016

Related U.S. Application Data

(60) Provisional application No. 62/029,050, filed on Jul. 25, 2014.

(51) Int. Cl.
*A01G 9/02*    (2006.01)

(52) U.S. Cl.
CPC ..................... *A01G 9/02* (2013.01)

(58) Field of Classification Search
CPC .......... A01G 9/02; A01G 9/028; A01G 9/104; A01G 5/04
USPC ....... 47/33, 66.1, 68, 86; 206/745; 220/4.01, 220/23.2, 23.4, 23.6; 217/13, 45
See application file for complete search history.

(56) References Cited

U.S. PATENT DOCUMENTS

| 986,395 A | 3/1911 | King |
| 2,782,561 A * | 2/1957 | Smith ............... A01G 13/0237 47/21.1 |
| 2,799,972 A | 7/1957 | Teixeira |
| 3,389,499 A * | 6/1968 | Haile ..................... E04C 1/395 220/23.4 |
| 3,520,082 A * | 7/1970 | Smith ..................... A01G 1/08 29/450 |
| 3,724,128 A * | 4/1973 | Tabone ................... A01G 1/08 47/33 |
| 3,747,268 A | 7/1973 | Linder |

(Continued)

FOREIGN PATENT DOCUMENTS

| EP | 0493244 A1 | 7/1992 |
| GB | 189724354 | 12/1897 |

*Primary Examiner* — David Parsley
*Assistant Examiner* — Danielle Clerkley
(74) *Attorney, Agent, or Firm* — Avery N. Goldstein; Blue Filament Law PLLC (57) ABSTRACT

A sectional planter is provided with an interior volume defining a planter portion with a flange and a tongue and groove for positively connecting the sectional planter to at least one additional sectional planter, where the tongue and groove connection allows for easy removal of the sectional planter from the base of a tree or post after assembly. The sectional planter can hold a variety of plants, shrubs, bushes or other floral or decorative items. The sectional planter may be combined with one or more additional sectional planters to form a geometric shaped planter. The geometric shapes formed with two or more interconnected sectional planters may be a circle, an oval, a square, a star pattern, a rectangle, a triangle, a trapezoid, or a parallelogram. In at least one embodiment two or more sectional planters are combined to form to encircle a tree.

15 Claims, 6 Drawing Sheets

(56) References Cited

U.S. PATENT DOCUMENTS

| | | | |
|---|---|---|---|
| 4,665,645 A * | 5/1987 | Schau, III | A01G 13/0237 47/32.7 |
| 4,788,792 A | 12/1988 | Womick | |
| 4,847,741 A | 7/1989 | Boettinger | |
| 4,986,025 A | 1/1991 | Imperial | |
| 5,454,189 A | 10/1995 | Graham et al. | |
| D374,843 S | 10/1996 | Attanasio | |
| 5,960,587 A | 10/1999 | Brasseur, Jr. et al. | |
| 6,085,459 A * | 7/2000 | Conner | A01G 9/02 47/41.01 |
| 6,123,214 A * | 9/2000 | Goebel | B65D 21/0204 206/805 |
| 6,161,333 A | 12/2000 | Poston | |
| 6,381,902 B1 | 5/2002 | Batshon | |
| 6,615,543 B1 | 9/2003 | Palsrok | |
| 6,862,843 B2 | 3/2005 | Missry | |
| 6,964,129 B2 | 11/2005 | Fenwick | |
| 7,076,900 B2 * | 7/2006 | Faulkner | A01G 9/006 40/645 |
| 7,080,482 B1 | 7/2006 | Bradley | |
| 7,155,860 B1 | 1/2007 | Ferguson, III | |
| 7,722,000 B2 | 5/2010 | Sherburne | |
| 7,797,880 B1 | 9/2010 | Kamau | |
| D737,098 S | 8/2015 | Smith | |
| 2004/0134124 A1 | 7/2004 | Fenwick | |
| 2004/0216376 A1 | 11/2004 | Missry | |
| 2005/0016063 A1 * | 1/2005 | Shen | A01G 1/08 47/33 |
| 2005/0034362 A1 * | 2/2005 | Anderson | A01G 1/08 47/33 |
| 2005/0223640 A1 * | 10/2005 | Hall | A01G 9/02 47/65.6 |
| 2006/0032132 A1 | 2/2006 | Liffers et al. | |
| 2007/0227067 A1 * | 10/2007 | Sieverding | A01G 9/021 47/65.5 |
| 2007/0227068 A1 | 10/2007 | Cataldi | |
| 2008/0078118 A1 | 4/2008 | Bissonnette et al. | |
| 2008/0141587 A1 * | 6/2008 | Guthrie | A01G 9/028 47/86 |
| 2009/0038220 A1 * | 2/2009 | Guthrie | A01G 9/028 47/85 |
| 2009/0113794 A1 | 5/2009 | Smith | |
| 2009/0194006 A1 | 8/2009 | Duncan | |
| 2013/0067810 A1 | 3/2013 | Kamau | |
| 2015/0000189 A1 * | 1/2015 | Greis-Avnon | A01G 9/022 47/66.5 |

* cited by examiner

FIG. 3D
(Detail A-A)

FIG. 4

SECTIONAL PLANTER WITH TONGUE AND GROOVE INTERLOCKING DEVICE

RELATED APPLICATION

This application claims priority benefit of U.S. Provisional Application Ser. No. 62/029,050 filed Jul. 25, 2014; the contents of which are hereby incorporated by reference.

FIELD OF THE INVENTION

The present invention relates to planters, and more specifically to a new and useful sectional planter with a tongue and groove connection mechanism for connecting additional planter sections.

BACKGROUND OF THE INVENTION

In outdoor landscaping or indoor decorating, it is often desired to surround trees or poles with a decorative feature to take away from the necessary details, such as roots or bases, which tend to be an eyesore. In decorating a pole base or the trunk of a tree a series of planters are often used, in which flowers, shrubs, or other plants are often used, arranged to the landscapers taste.

Many solutions have been presented for providing planters that can be used for such landscaping trends. Patents illustratively including U.S. Pat. No. 986,395 or U.S. Pat. No. 4,788,792, for instance, provides a series of containers that can be arranged to for surrounding trees or posts, however one drawback from these configurations is the failure in the sectional pieces of the planter to interlock to each other holding the configuration together, thus often providing unsightly gaps making the decorating trend look unsightly.

U.S. Pat. No. 3,747,268 similarly attempts to provide a planter solution for this trend, however it too remains to have interlocking problems, despite the peg and hole arrangement, thus U.S. Pat. No. 3,747,268 also provides for a wing nut and bolt assembly that allows for at least two sectionals to be connected. One drawback from this method is that once connected and filled with dirt and plants, it becomes very difficult to separate the planters because the wing nut gets buried. In addition, the buried wing nut, over time of being exposed to water and dirt, will begin to corrode, thus making the separation of the wing-nut and bolt nearly impossible without breaking the planter, and rendering it unusable.

Thus, there exists a need for a sectional planter that may be connected to other sectional planter pieces and providing the ability of surrounding the base of a post or tree, while being positively held together preventing gaps, while maintaining the ability to be separated at a later time without sacrificing the planter.

SUMMARY OF THE INVENTION

A sectional planter is provided with an interior volume defining a planter portion with a flange and a tongue and groove for positively connecting the sectional planter to at least one additional sectional planter, where the tongue and groove connection allows for easy removal of the sectional planter from the base of a tree or post after assembly. The sectional planter can hold a variety of plants, shrubs, bushes or other floral or decorative items.

The sectional planter may be combined with one or more additional sectional planters to form a geometric shaped planter. The geometric shapes formed with two or more interconnected sectional planters may be a circle, an oval, a square, a star pattern, a rectangle, a triangle, a trapezoid, or a parallelogram. In at least one embodiment two or more sectional planters are combined to form a circle for encircling a tree. In at least one embodiment the inventive sectional planters may be stacked within one another for storage or display, and made of materials known in the art that allow the sectional planters to be stackable and portable. In at least one embodiment the sectional planter is made from clay, poly-vinyl chloride (PVC), plastic, ceramic, metal, wood, fiber glass, a glass reinforced plastic or combinations thereof.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 2A-2C provide various views of the sectional planter 100 where

FIGS. 3A-3D provide various views of the sectional planter 100 where

DESCRIPTION OF THE INVENTION

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

Various terms used throughout the specification and claims are defined as set forth below as it may be helpful to an understanding of the invention.

This application has utility in providing for a sectional planter with a tongue and groove interlocking device such that at least two sectional planters may be combined for encircling a tree trunk, architectural column, or post.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The following description of the preferred embodiments of the invention is not intended to limit the invention to these preferred embodiments, but rather to enable any person skilled in the art to make and use this invention.

Figure 1:
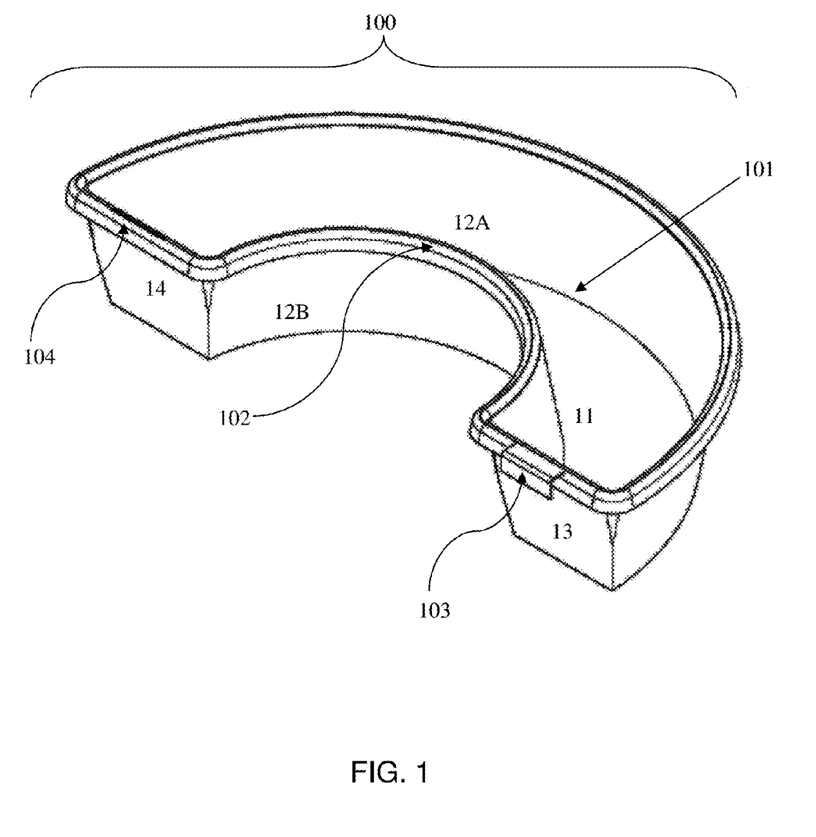
FIG. 1 is an isometric view of the inventive sectional planter 100 in accordance with an embodiment of the invention.
Figure 2A:
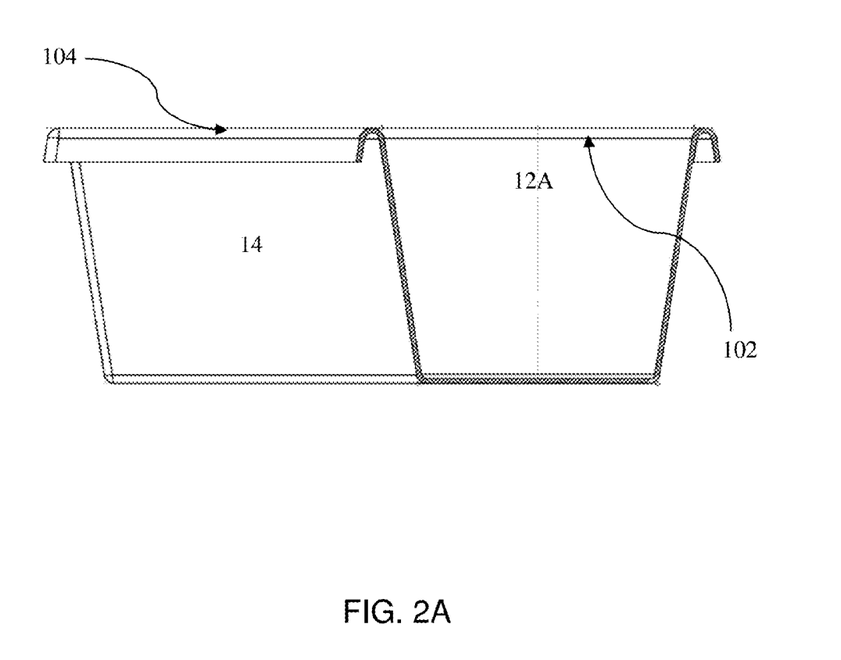
FIG. 2A is a left side view of the sectional planter 100 illustrating one embodiment of the inventive sectional planter 100.
Figure 2B:
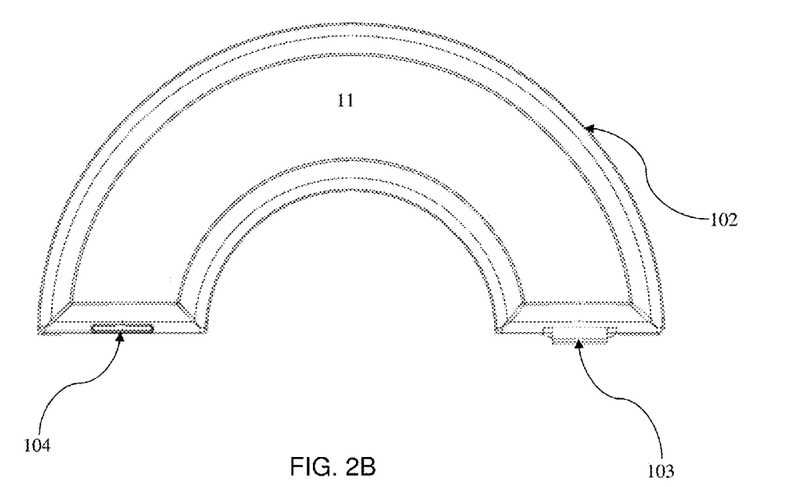
FIG. 2B is an overhead view of one embodiment of the sectional planter 100.
Figure 2C:
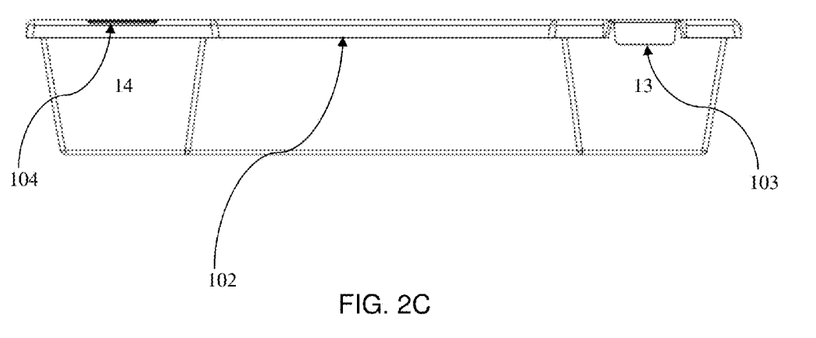
FIG. 2C is a front view of one embodiment of the sectional planter 101.
Figure 3A:
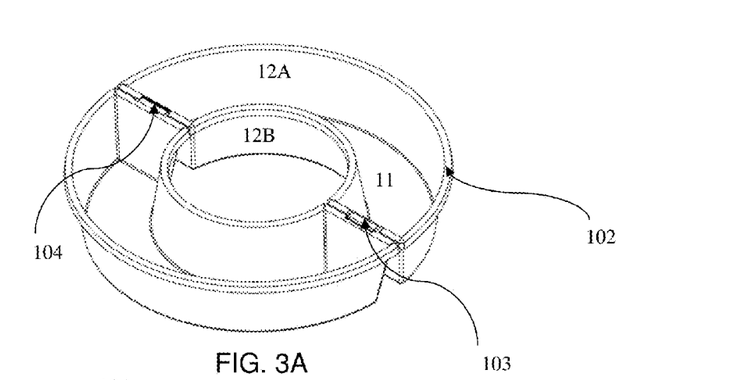
FIG. 3A is a perspective view of two sectional planters 100 joined together via the tongue 103 and groove 104 connection system.
Figures 3B, 3C, 3D:
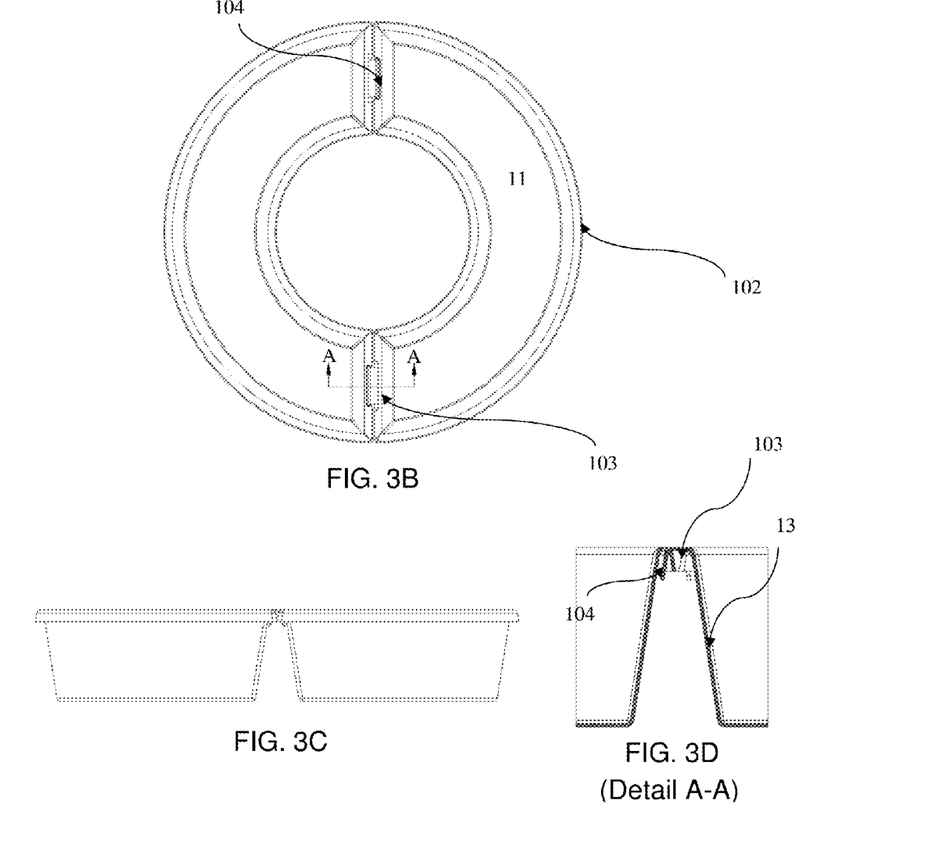
FIG. 3B is a top view of the joined two sectional planters 100.
FIG. 3C is a side view of the joined two sectional planters 100.
FIG. 3D is a sectional detail view of the joined tongue 103 and groove 104 connection system of FIG. 3B.
Figure 4:
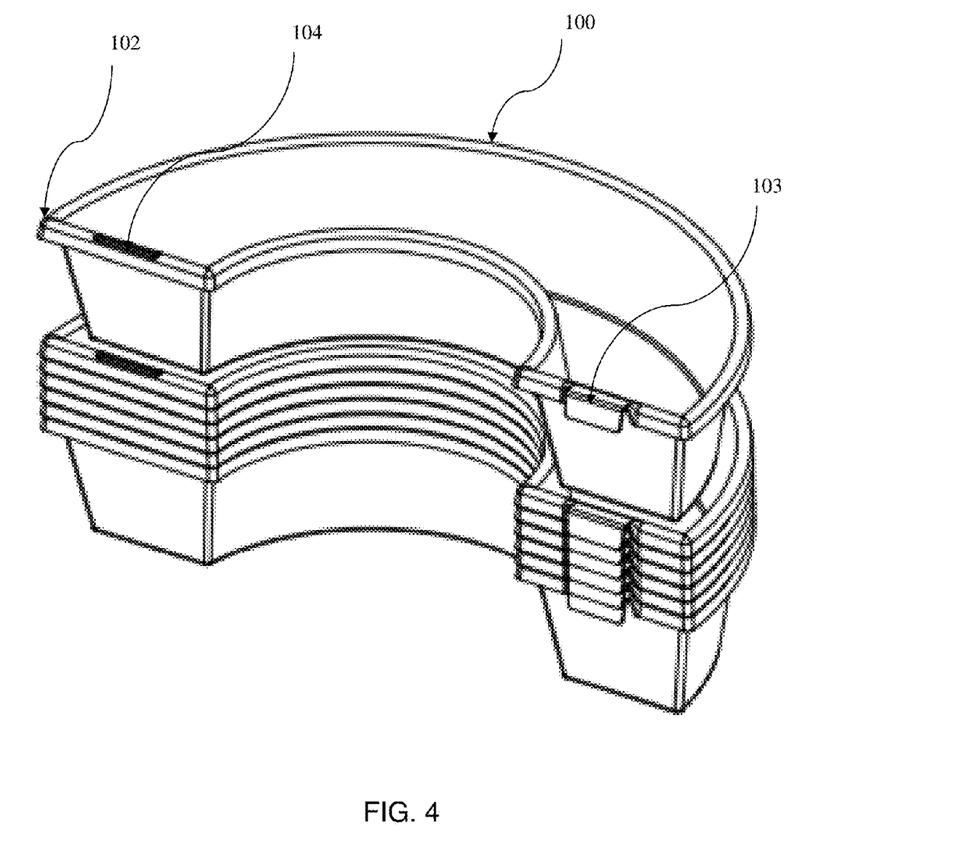
FIG. 4 is a perspective view of a stack of inventive sectional planters 100.

FIG. 1 depicts an embodiment of an inventive sectional planter at generally 100. The sectional planter 100 has an interior volume defining a planter portion 101, a flange 102 and a tongue 103 and groove 104 for positively connecting the sectional planter 100 to at least one additional sectional planter 100, where the tongue 103 and groove 104 connection system allows for easy removal of the sectional planter 100 from the base of a tree or post after assembly. The sectional planter 100 can hold a variety of plants, shrubs, bushes or other floral or decorative items known in the art of interior design or landscaping. In at least one embodiment, the sectional planter 100 may be combined with one or more additional sectional planters 100 to form a geometric shaped planter. In at least one embodiment, the geometric shapes formed with two or more interconnected sectional planters 100 may be a circle, an oval, a square, a star pattern, a rectangle, a triangle, a trapezoid, or a parallelogram. In at least one embodiment two or more sectional planters 100 are combined to form a circle for encircling a tree. In at least one embodiment the inventive sectional planters 100 may be stacked within one another for storage or display as shown in FIG. 4, and made of materials known in the art that allow the sectional planters 100 to be stackable and portable, or such materials as may later herein be described. In at least one embodiment the sectional planter 100 is made from clay, poly-vinyl chloride (PVC), plastic, ceramic, metal, wood, fiber glass, a glass reinforced plastic or combinations thereof.

Planter Portion

The volume defined by the planter portion 101 of the inventive sectional planter 100 allows for the planting of plants, and for using aggregates or fillers that are normally used in the art. For instance, lawyers of rock and dirt may be used to allow for maintaining the proper moisture within the soil of the planter. In addition, foam or other fillers may be used to fill space or volume within the planter portion. In at least one embodiment, the planter portion 101 has a bottom 11, at least one side (12A or 12B), a first end 13, and a second end 14. In at least one embodiment the inventive planter 100 has at least two sides, an outer side 12A and an inner side 12B. In at least one embodiment the bottom 11, outer side 12A, the inner side 12B, the first end 13 and the second end 14 form the planter portion 101 which provides for an open top. In at least one embodiment, the planter portion 101 is in the shape of a portion of a circle. A portion of a circle may be a sixteenth of a circle, an eighth of a circle, a quarter of a circle or a semi-circle. Two or more sectional planters 100 may be interconnected to form an eighth of a circle, a quarter of a circle, a semi-circle or a circle. In at least one embodiment, the bottom 11, the at least one side (12A or 12B), the first end 13 or the second end 14 may be perforated to allow the flow of excess water.

The planter portion 101 may be of several sizes to be adapted to a particular landscape, tree trunk or post. In one embodiment, where the geometric shape created by the interconnection of two or more sectional planters 100 is a circle, the inner circle radius is from 3 inches to 2 feet. In one embodiment, the planter portion 101 is anywhere from 24 inches to at least 6 inches deep. In at least one embodiment, the 101 planter portion is further to be adapted for ease storage and display, thus one or more sectional planters should be able to be stackable within each other. In at least one embodiment the bottom 11 of the planter portion 101 is anywhere from 6 inches wide to 24 inches wide. In at least one embodiment, the top of the planter portion 101 has a width between 6 inches and 24 inches. In at least one embodiment, the top of the planter portion 101 is to be wider than the bottom 11. For example, in at least one embodiment the top of the planter portion 101 is 8 inches wide while the bottom of the planter portion 101 is 6 inches wide, allowing for one 100 sectional planter to rest within the second sectional planter 100 as shown in FIG. 4.

Flange Portion

Attached to the top exterior of the planter portion 101 is a flange portion 102 that goes around the (12A or 12B) side of the planter portion 101. In one embodiment, the flange portion 102 is to provide a control surface for lifting the sectional planter 100 from the ground by using fingers, instead of having to pick up the sectional planter 100 from the bottom. In at least one embodiment, the flange portion 102 of the sectional planter 100 allows for the separation of multiple stacked sectional planters 100 when being stored or placed on display. In at least one embodiment, the flange portion 102 provides the ability for the sectional planter 100 to be elevated or hung. In at least one embodiment the flange portion 102 is used to hook to screws, nails, or some other protruding anchor that may hold the underside of the flange portion 102. In at least one embodiment, the flange portion 102 may extend from the planter portion 101 anywhere from one quarter of an inch to 2 inches. In at least one embodiment, the flange portion 102 extends from the top exterior of the planter portion 101 at least three-quarters of an inch.

In at least one embodiment, the flange portion 102 forms a cylinder for receiving a liquid and acting as a pipe. In at least one embodiment, the flange portion 102 forms a cylinder and is perforated such that the flange portion 102 enables automatic watering of the plants in the inventive sectional planter 100.

Tongue and Groove Portion

The inventive sectional planter 100 may be used as standalone sectional planters 100, but may be interlocked with one or more additional sectional planters 100 using a tongue 103 and groove system 104. In at least one embodiment a first end 13 of the planter portion 101 has at least one tongue 103 affixed to said first end 13 for inserting into a groove 104. In at least one embodiment, the tongue 103 alternatively extends downward from the flange 102. The thickness of the tongue 103 may range from one thirty-second of an inch to one inch. The width of the tongue 103 may range from one half (½) inch to six (6) inches. The tongue portion 103 is preferably made of the same material as the planter portion 101 and the flange portion 102. In at least one embodiment, the tongue portion 103 is made of a different material than the planter portion 101 or the flange portion 102 and may be made from wood, metal, plastic, rubber, PVC, glass reinforced plastic, fiberglass, or combinations thereof. In at least one embodiment the tongue 103 is 3 inches in width and one quarter inch in thickness. The tongue portion 103 may protrude perpendicular or parallel to the first end 13 of the planter portion 101. In at least one embodiment, the tongue portion 103 extends downward from the top of the first end 13 of the planter portion 101.

Each tongue portion 103 is to have the ability to interconnect an additional sectional planter 100 using a groove 104 to receive a 103 tongue from at least one additional sectional planter 100. In at least one embodiment a second end 14 of the planter portion 101 has at least one groove 104 cut into the flange portion 102 for receiving a tongue portion 103 from another sectional planter 100. The thickness of the may range from one thirty-second of an inch to one inch.

The width of the groove 104 may range from one half (½) inch to six (6) inches. In at least one embodiment, the groove portion 104 is reinforced using wood, metal, plastic, rubber, PVC, glass reinforced plastic, fiberglass, or combinations thereof. In at least one embodiment the groove 104 is 3 inches in width and one quarter inch in thickness. The groove portion 104 portion may alternatively be carved into the top of the second end 14 of the planter portion 100, or may be carved into the top or side of the flange 102 at or near the second end 14 of the planter portion 101. In at least one embodiment, the groove portion 104 is on the top of the flange portion 102 at the 102 second end 102 of the planter portion 101 for receiving a tongue portion 103 extending downward from the top of the first end 13 of a different planter portion 100.

EXAMPLES

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Example 1

The inventive planter is used for landscaping around a tree, where two sectional planters are interconnected to form a circle. Each sectional planter is made of plastic. The landscaper estimates the diameter of the tree and a sectional planter that can be combined to have an inside diameter larger than the outside diameter of the tree trunk is selected. The landscaper receives the sectional planters stacked inside one another, and separates each sectional planter. The landscaper fills each sectional planter separately, placing dirt, rocks, and plants into each sectional planter. Upon completing the planting, the landscaper stages each sectional planter around the base of the trunk of the tree. The landscaper then connects the tongue of the first sectional planter to the groove of the second sectional planter, while connecting the tongue of the second sectional planter, to the groove of the second sectional planter. The combination of the sectional planters provides an interlocked planter encircling the tree that does not easily become separated by animals, or accidentally when knocked by a landscaper, child, or equipment in the vicinity of the planter.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The invention claimed is:

1. A sectional planter comprising:
    a planter portion having a bottom wall configured to support planted material, a first side wall, a second side wall, a first end, and a second end, said bottom wall; said first side wall, said second side wall, said first end and said second end form said planter portion having an open top, wherein said planter portion is in the shape of a portion of a geometric shape;
    a flange portion extending around the entire perimeter of said open top of said planter portion;
    at least one tongue extending toward said bottom wall from said flange portion at said first end; and
    at least one groove defined in said flange portion at said second end;
    wherein said at least one groove is configured for receiving the at least one tongue.

2. The sectional planter of claim 1 wherein said at least one tongue and said at least one groove are used for interconnecting at least two planter portions to form a complete geometric shape.

3. The sectional planter of claim 1 wherein said geometric shape is a circle, a square, a triangle, a rectangle, an oval, a star, a trapezoid, or combinations or variations thereof.

4. The sectional planter of claim 1 wherein said planter portion is in the shape of a sixteenth of a circle, an eighth of a circle, a quarter circle, or a semi-circle.

5. The sectional planter of claim 1 wherein interconnecting at least two planter portions forms a planter in a circle for encircling a post or tree.

6. The sectional planter of claim 1 wherein said planter portion is at least 6 inches deep.

7. The sectional planter of claim 1 wherein the bottom of said planter portion is at least 6 inches wide.

8. The sectional planter of claim 1 wherein said open top is at least 8 inches wide.

9. The sectional planter of claim 1 wherein said flange portion extends from said first side wall at least three-quarters of an inch.

10. The sectional planter of claim 1 wherein said at least one tongue is at least 3 inches wide one quarter inch thick and extends 1 inch in length downward and parallel to said first end.

11. The sectional planter of claim 1 wherein said at least one groove is at least 3 inches wide and one quarter inch thick.

12. The sectional planter of claim 1 wherein at least one surface of said planter portion is perforated.

13. The sectional planter of claim 1 wherein said sectional planter is made from clay, ceramic, poly vinyl chloride (PVC), plastic, wood, metal, or combinations thereof.

14. The sectional planter of claim 1 wherein said flange portion forms a cylinder that may be adapted to receive a flow of liquid.

15. The sectional planter of claim 14 wherein said flange portion is further perforated to allow for watering of said sectional planter.

\* \* \* \* \*